United States Patent
Murphy

(10) Patent No.: US 6,715,975 B1
(45) Date of Patent: Apr. 6, 2004

(54) TENSION CONTROL ARRANGEMENT FOR A BOLT

(76) Inventor: Stephen Murphy, "Navarre" Old Blackrock Road, Cork, bm4954 (IE)

( * ) Notice: Subject to any disclaimer, the term of this patent is extended or adjusted under 35 U.S.C. 154(b) by 0 days.

(21) Appl. No.: 09/937,489
(22) PCT Filed: Mar. 24, 2000
(86) PCT No.: PCT/IE00/00035
§ 371 (c)(1),
(2), (4) Date: Dec. 26, 2001
(87) PCT Pub. No.: WO00/58635
PCT Pub. Date: Oct. 5, 2000

(30) Foreign Application Priority Data

Mar. 25, 1999 (IE) .............................................. S990237

(51) Int. Cl.[7] ........................... F16B 19/00; F16B 31/00
(52) U.S. Cl. ...................... 411/14.5; 411/354; 411/916; 301/35.625
(58) Field of Search ................................ 411/14.5, 354, 411/916, 917; 301/35.623, 35.625

(56) References Cited

U.S. PATENT DOCUMENTS 5,022,672 A * 6/1991 Kawai .................... 411/354 X
5,257,855 A * 11/1993 Nagano .................. 411/354 X
5,590,991 A * 1/1997 Garuglieri ................... 411/354

* cited by examiner

Primary Examiner—Neill Wilson
(74) Attorney, Agent, or Firm—Rooks Pitts

(57) ABSTRACT

A tension control arrangement including a plurality of cams disposed about an opening that accommodates a bolt to which a nut is intended to be secured. Each of the cams has a contoured outer surface, and each of the cams is rotatably supported such that the contoured outer surface operatively engages both the base and a contact member interposed between the cam and the nut. A lever assembly is operatively coupled to the cams, such that movement of the cams is substantially restricted to rotational motion from a first position in which the nut is engaged with the bolt and tightened by hand until it is seated against the contact member, to a second position in which the bolt is elongated to achieve a predetermined bolt tension.

31 Claims, 9 Drawing Sheets

TENSION CONTROL ARRANGEMENT FOR A BOLT

FIELD OF THE INVENTION

This invention relates generally to control of bolt tension and in particular to accurate control of bolt tension in bolted joints, for example those used during wheel mounting, and is more particularly directed toward control of bolt tension in wheel mounting applications through accurate control of bolt elongation to produce the desired tension. The invention may also be accepted for other applications such as tensioning cables etc.

BACKGROUND OF THE INVENTION

Bolt tension is the primary parameter of interest in arrangements where mating nuts and bolts are used to secure mechanical assemblies in position. Although a torque wrench is often the implement prescribed by manufacturers for setting bolt tension, a simple measurement of how tightly the nut and bold are connected does not necessarily translate into an accurate measure of the bolt tension. This discrepancy can occur because of friction between the nut and bolt, or because of dirt or other impurities that may insinuate themselves between the nut and its mating surface.

In the attachment of wheels to vehicles. Traditionally the tension has been achieved by rotation of a nut on a bolt. The rotation pulls the bolt through the nut. Incorrect bolt tension can be particularly dangerous, since it can lead to early failure of the bolts and detachment of the wheel. This failure scenario can be caused by bolt tension being too little, which causes the wheel/hub interface to slip, shearing the bolts. Failure can also be caused by excessive tension, which causes metal fatigue in the bolt and permanent plastic deformation or stretching. This in turn leads to insufficient tension in the system, causing subsequent slippage and shearing of the bolts. Using the traditional methods it is difficult to be confident that the correct tension has been achieved.

Since there is often poor correlation between the amount of torque applied to a nut and the resulting tension in the bolt, a need arises for a new arrangement that allows simple and accurate control of bolt tension, particularly in critical applications such as the mounting of wheels to vehicles.

SUMMARY OF THE INVENTION

These needs and others are satisfied by the arrangement of the present invention, in which a bolt tension adjustment may be built into a component, such as a wheel, in a system requiring precise bolt tensioning. In the arrangement described, a wheel may be mounted to a vehicle in such a way that the installer will have a high confidence that the mounting is secure, by virtue of precise setting of bolt tension. This arrangement obviates the uncertainty inherent in installation procedures in which simple torque wrenches are used to set bolt tension. As has been suggested, the simple adjustment of tightening torque does not necessarily correlate well with proper bolt tension in the completed assembly.

To accomplish a proper adjustment, an arrangement as contemplated herein is made a part of the wheel, for example. The arrangement includes cams that are disposed on either side of an opening in the wheel that is designed to accommodate a bolt. The cams are eccentric, as is typical of cam design, and are rotatably mounted on shafts that allow the outer contoured surfaces of the cams to rotate such as to present an increasing cam diameter between an abutting base surface and the nut that engages the mounting bolt. A removable lever assembly allows the installer to rotate the cams to a position of minimum tension, mount the wheel in position so that the mounting bolts protrude properly through the mounting holes, then engage the nuts on the mounting bolts, hand tightening them against an abutting surface. The lever is then used to rotate the cams into a second position that presents the cams' maximum diameter between the base surface and the nut. This positioning of the cams elongates the bolts to the point where bolt tension is optimum and a secure coupling of bolts and nuts is ensured. The lever assembly is then withdrawn to prevent tampering.

In one form of the invention, a tension control arrangement including a base having an opening therethrough to accommodate a bolt and a nut in engagement with the bolt is provided. This tension control arrangement is characterised by a plurality of cams disposed about the opening, each of the cams having a contoured outer surface, and wherein each of the cams is rotatably supported such that the contoured outer surface operatively engages both the base and a contact member interposed between the cam and the nut. A lever assembly is operatively coupled to the cams, such that movement of the cams is substantially restricted to rotational motion from a first position in which the nut is engaged with the bolt and tightened by hand until it is seated against the contact member, to a second position in which the bolt is elongated to achieve a predetermined bolt tension. One or more grooves may be provided in the base, each of the grooves having an arcuate inner surface upon which the contoured outer surface of each cam rests.

The contact member interposed between the cam and the nut is a pressure block having a groove facing the contoured outer surface of the cam, the groove having an arcuate inner surface upon which the contoured outer surface of the cam rests. In one embodiment, the contact member interposed between the cam and the nut has an opening formed therethrough to accommodate the bolt, and the contact member is integrally formed so as to provide contact members for a pair of cams. The lever assembly that is operatively coupled to the cams includes elements that contact the base assembly to substantially preclude cam rotation except within a range between the first position and the second position.

Further objects, features, and advantages of the present invention will become apparent from the following description and drawings.

DETAILED DESCRIPTION OF THE INVENTION

Figure 1:
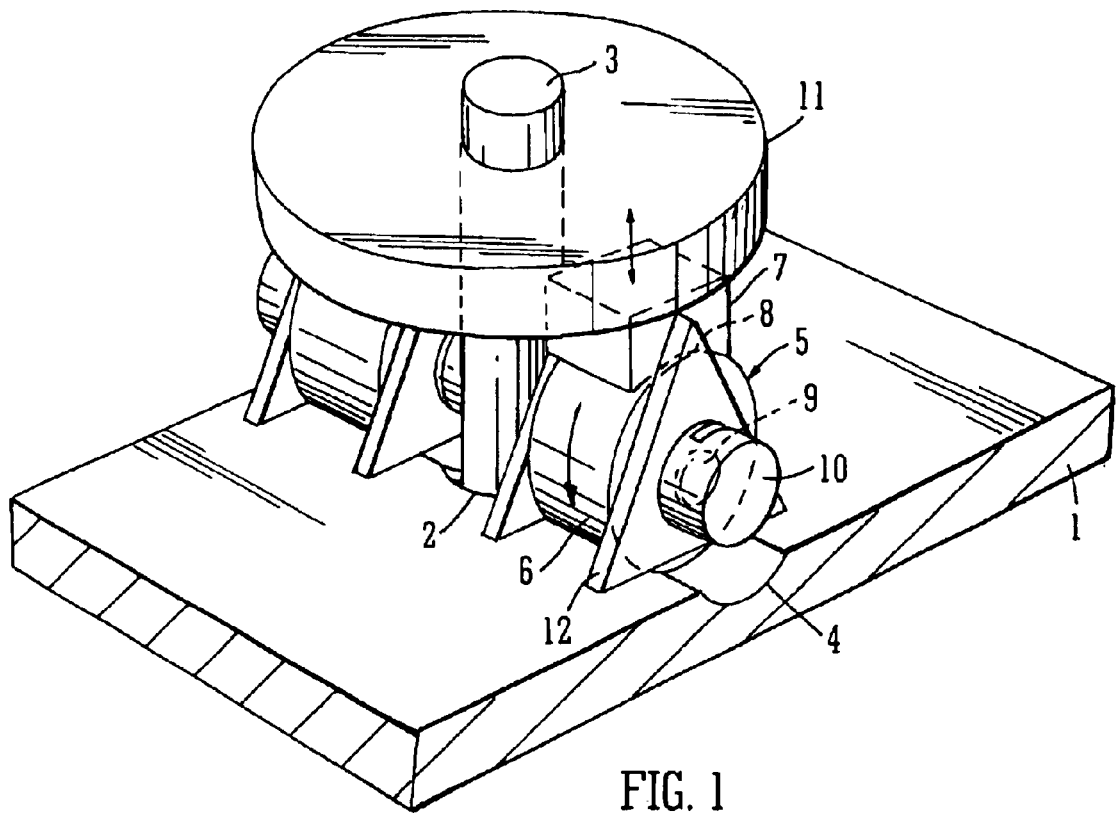
FIG. 1 is perspective view of a bolt tension control arrangement in accordance with the present invention.

FIG. 1 illustrates an arrangement for accurately controlling bolt tension in accordance with the present invention. In a typical application such as the mounting of wheels on commercial vehicles, the tensioning arrangement of FIG. 1 may be disposed on a wheel or hub, or may be contained on a ring or other cover that fits over the wheel. In any event, the hub or wheel forms a base (1) as indicated in FIG. 1. An opening (2) is provided in the base through which a bolt (3) extends. A nut (11) engages the bolt (3) and is preferably circular in cross-section, rather than square or hexagonal, in order to minimise the problem of over-tightening. The nut (11) may be equipped with a knurled or otherwise textured area around its circumference, so the nut can be tightened down into an initial state by hand. Of course, it may be advantageous to make the perimeter of the nut (11) a relatively smooth surface, as a further safeguard against over-tightening.

A cam mechanism is provided to exercise control over bolt tension. In the preferred embodiment, two cams (5) are utilised, one disposed on each side of the bolt (3). The cams (5) need not have a very high eccentricity to accomplish the small amount of bolt elongation generally necessary to achieve sufficient bolt tension, and may actually appear to be circular to the unaided eye. The cam (5) has a major axis that corresponds to the cam diameter where it is largest. The minor axis of the cam corresponds to the cam diameter where it is smallest. As will be appreciated during the subsequent discussion, when the major axis of the cam is aligned with the longitudinal axis of the bolt, bolt tension is properly set.

Grooves (4) are provided in the base in an effort to minimise contact stresses. Without the grooves (4), it is conceivable that plastic or permanent deformation of the contact surfaces could occur, manifesting itself in a compression of the mating surfaces. This compression could reduce the elongation imparted to the bolt (3). The outer surface (6) of the cam (5) rests against the groove (4) surface. In the embodiment shown and described, a shaft (9) passing through the cam centre is used to mount the cam in position. A protrusion (10) is affixed to the shaft (9) and provided with a slot to accommodate a lever arrangement. Use of the slot in the protrusion (10) allows the lever's position to be accurately known, while the shape of the lever can be used to control how far the lever can move, and consequently how far the cam can rotate.

Figure 2:
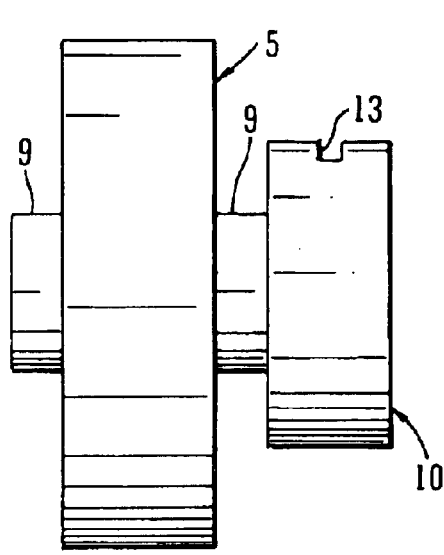
FIG. 2 is a side elevational view of a cam and shaft assembly suitable for inclusion in the arrangement of FIG. 1.
Figure 3:
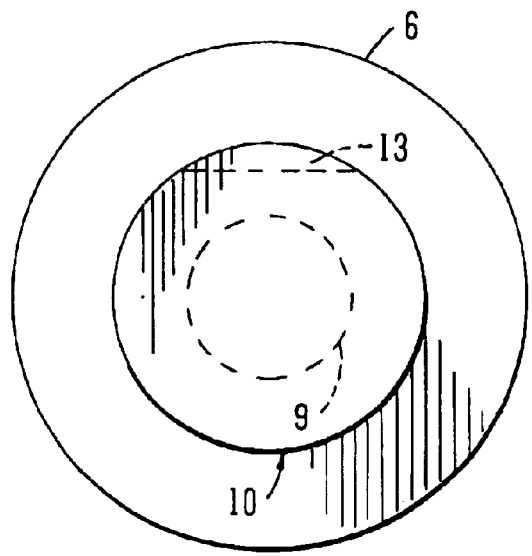
FIG. 3 is a front elevational view of the cam and shaft assembly of FIG. 2.

A representative cam (5) can be viewed in more detail in FIGS. 2 and 3, where the orientation of the cam shaft (9) is shown with particularity. As depicted in FIGS. 2 and 3, the shaft (9) passes through the centre of the cam (5) and defines the cam's axis of rotation. At one end of the shaft (9), the protrusion (10) previously described is disposed, equipped with a slot (13) that mates with the actuation lever for the assembly. Of course, the protrusion (10) need not be disposed at a point beyond the mounting bracket (12), as illustrated in FIG. 1 and described below. For the sake of convenience in some applications, the protrusion (10) and its accompanying lever slot (13) could just as easily be positioned inside the brackets (12).

Figure 5:
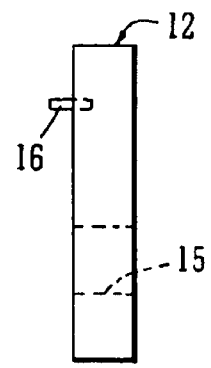
FIG. 5 is a side elevational view of a mounting bracket as illustrated in FIG. 1.

The brackets (12) that hold the cams (5) in place may be integrally formed as part of the base (1), or they may be separately fabricated and attached by a suitable method, such as brazing or welding. The bracket (12) is depicted in side view in FIG. 5, which also shows the mounting hole (15) that accommodates the shaft (9) about which the cam (5) rotates. It should be noted that the opening (15) in the bracket (12) should be slightly elongated along the longitudinal axis of the bolt (3 in FIG. 1) so that contact can be maintained at all times between the cams and both the base and the pressure blocks (7) (described in greater detail below) during all angles of cam rotation.

Positioned opposite the grooves (4) in the base (1) are pressure blocks (7) that move against the underside of the nut (11) as the cam major axis is aligned with the longitudinal axis of the bolt (3). Each pressure block (7) is equipped with a groove (8) on its underside shaped similarly to the groove (4) provided in the base, and also intended to be in contact with the outer surface (6) of the cam (5) as a mechanism to minimise contact stresses. Stress reduction at these points of contact is intended to prevent plastic/permanent deformation of the contact surfaces, which could manifest itself in a compression of the mating surfaces and reduce the elongation imparted to the bolt. For maximum effectiveness, it is appropriate to design the cams (5) such that the outer surfaces have opposed regions of constant radius along the major axes. In this way, the mating grooves can be provided with the same radius, thus ensuring that bolt tensioning will not impart a torque of any kind to the cams (5) that might tend to move them out of position. Of course, there may be applications in which implementation of either the grooves (4) in the base (1) or the grooves (8) in the pressure blocks (7), or both, may be viewed as unnecessary, and they may consequently be eliminated. Absence of the grooves does not affect device operation materially, but may lead to eventual loss of proper tension calibration over time.

Figure 6:
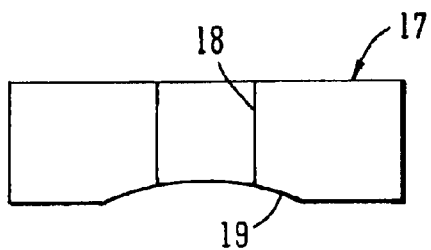
FIG. 6 is a side elevational view of an alternative embodiment of a pressure block.
Figure 7:
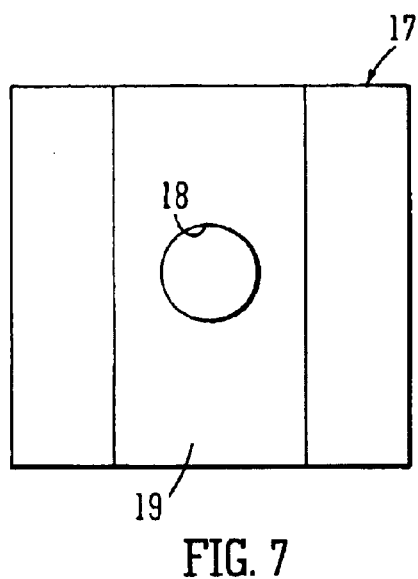
FIG. 7 is a bottom plan view of the pressure block depicted in FIG. 6.

As illustrated in FIGS. 6 and 7, the pressure blocks (7) can also be realised as an integrally formed unit (17) that can easily be disposed between the cams (5) and nut (11) in place of the single pressure blocks (7) illustrated in FIG. 1. The unitary assembly (17) would require an opening (18) to accommodate the bolt (3), and may be equipped with a groove (19) that serves the same purpose as the grooves (8) in the individual pressure blocks (7) discussed previously.

Figure 4:
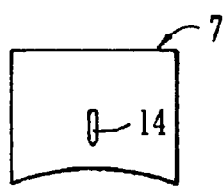
FIG. 4 is an elevational view of a pressure block as shown in FIG. 1.

Turning once again to FIG. 5, one embodiment of a mounting arrangement for the pressure blocks (7) can be viewed. A guide pin (16) is inserted into the interior surface of each mounting bracket (12). The guide pins (16) interface with mating slots (14) provided on facing surfaces of the pressure blocks (7), as depicted in FIG. 4. Through the use of the pins (16) and slots (14), the pressure blocks (7) are held in operative position such that the blocks (7) may move only in a direction parallel to the longitudinal axis of the bolt (3). Of course, other suitable mounting techniques for the pressure blocks (7) will occur to those skilled in the applicable art, and the description above is intended only to set forth one suitable technique without limiting the invention in any way.

In utilising the bolt tensioning arrangement described above, the cams are positioned initially such that the cam minor axes are aligned with the bolt longitudinal axis. It should be noted that in applications where there are cams disposed on either side of the bolt, as shown in FIG. 1, the lever arrangement (discussed below) is preferably designed to move both cams in unison. After the cams have been rotated so that the minor axes are in alignment with the longitudinal axis of the bolt, the nut (11) is tightened by hand until it is firmly biased against the pressure blocks (7). There is no further movement between the threads of the bolt and the nut (11). The lever is then used to rotate the cams so that the major axes of the cams are in alignment with the longitudinal axis of the bolt. Since this corresponds to the cam's largest diameter being interposed between the base and the pressure block, the prescribed tension dictated by the cam lobe differential has now been applied to the bolt in question. The rotation of the can effects the movement of the nut away from the base, which as the nut is attached to the bolt effects a corresponding movement of the bolt.

Figure 8:
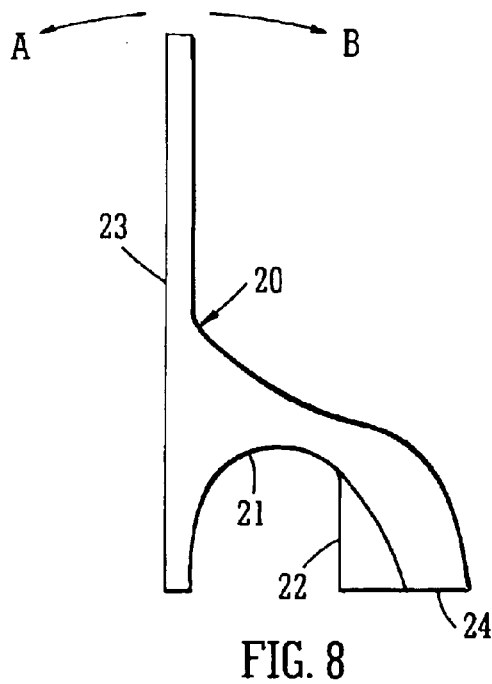
FIG. 8 is a side view of a lever suitable for inclusion in the arrangement described herein.
Figure 9:
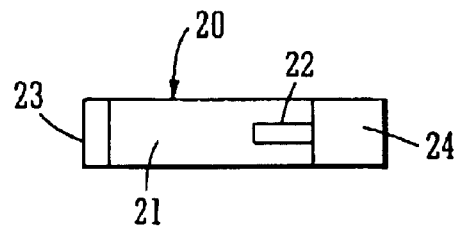
FIG. 9 is an end view of the lever illustrated in FIG. 8.

The actuation lever (20) that is shown in FIGS. 8 and 9 is intended to be removable to prevent unwanted operation of the tensioning mechanism. As suggested above, it is a relatively simple matter for one skilled in the art to provide a mating lever assembly that firmly engages the slots (13) for both cams, so that the cams can be operated simultaneously, and so that the amount of rotation of the cams can be effectively controlled. The lever assembly can be designed to incorporate physical features that engage the base portion to stop rotation at predetermined points.

In the illustrative embodiment of a suitable lever (20) depicted in FIGS. 8 and 9, a cup portion having an arcuate inner surface (21) is provided to fit snugly around the protrusion (10) that extends from the cam shaft (9). A blade or tab (22) is provided within this cup portion (21) to engage the slot (13) in the protrusion (10) to ensure positive operation. Rotation in direction A is stopped by the contact of surface 23 with the abutting surface of the base (1) as the lever (20) is used to rotate the cams (5) into the initial position, where the cam minor axes are aligned with the bolt longitudinal axis. As the lever (20) is used to rotate the cams (5) into locked position, with the major axes aligned with the bolt longitudinal axis, rotation in direction B beyond this position of maximum engagement is prevented by surface (24) of the lever (20) coming into contact with the abutting surface of the base (1). Of course, other lever geometries that may be more suitable for particular applications will occur to the skilled practitioner.

Another design for a lever assembly that is even easier to use and may be less prone to incorrect operation involves the installation of a ratchet mechanism within the lever assembly, or perhaps incorporated as part of the protrusion (10) to which the lever assembly is mounted. With a ratchet-type mechanism, the cams can be correctly aligned for proper bolt tension in a series of partial rotations of the cams rather than one continuous rotation process. Implementation of a ratchet mechanism also permits control of cam excursion through the disconnection of the ratchet drive at predetermined angles. For example, at precisely the point where the cam major axes are aligned for proper bolt tension, the ratchet may be disconnected through an internally provided stop to preclude further cam rotation.

Figure 10:
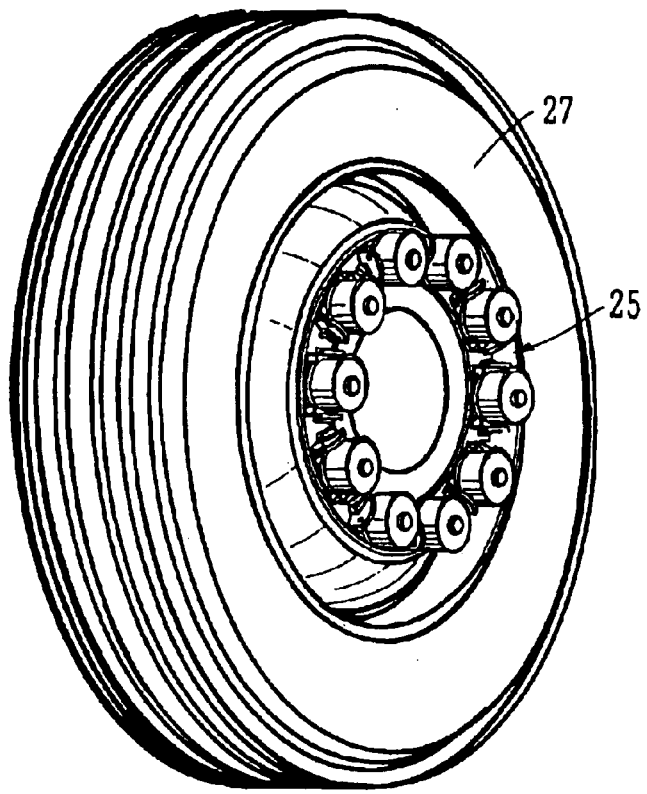
FIG. 10 is a perspective view of the second embodiment of the invention in place on a commercial vehicle wheel.
Figure 11:
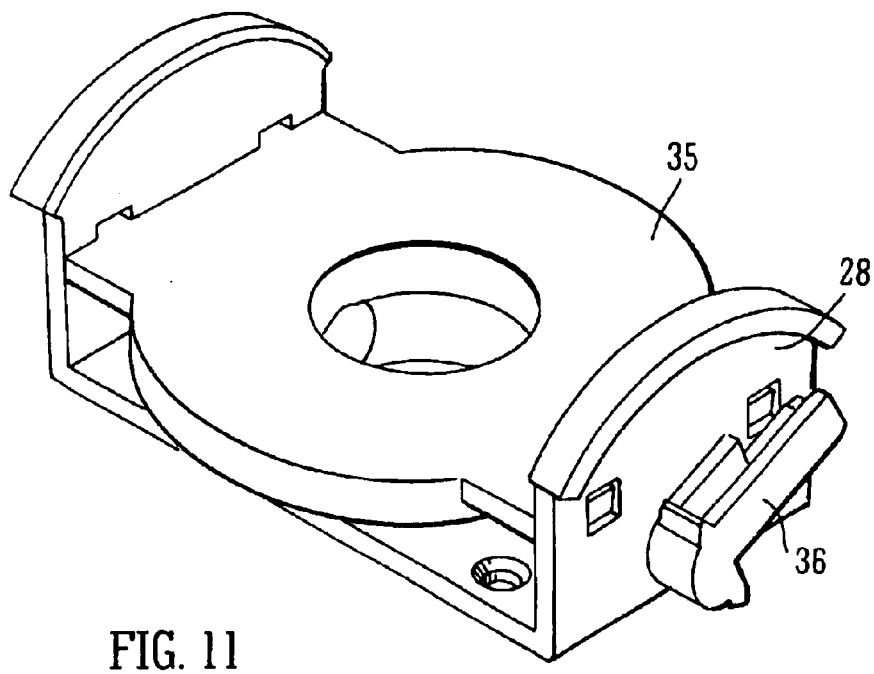
FIG. 11 is a perspective view of a fork-piece assembly suitable for use with the embodiment shown in FIG. 10.

In a second embodiment, as shown in FIG. 10, the assembly for a single bolt (3) can be made a self-contained, distinct unit (25), as shown in FIG. 11. A plurality of these units (25) can then be attached to a mounting ring (26), as outlined before and shown in FIG. 12, or directly to the wheel (27) or flange. The basic shape of these units is determined by the fork-piece (28), shown in FIG. 13, as the other components are mounted to this piece. The fork-piece (28) has an opening (29) in its base to accommodate the bolt (3). Other openings (30) may be required if the fork-piece (28) is to be screwed or riveted onto the mounting ring (26) or wheel (27), the number and locations of these openings (30) will be determined by the particular design criteria and will be obvious to those skilled in the art.

Grooves (32), as described in the first embodiment of the invention, are also provided in this, second embodiment. These grooves (32) are to be in the fork-piece (28), as shown, and are effectively the same as the grooves (4) provided in the base (1) in the first embodiment.

Figure 14:
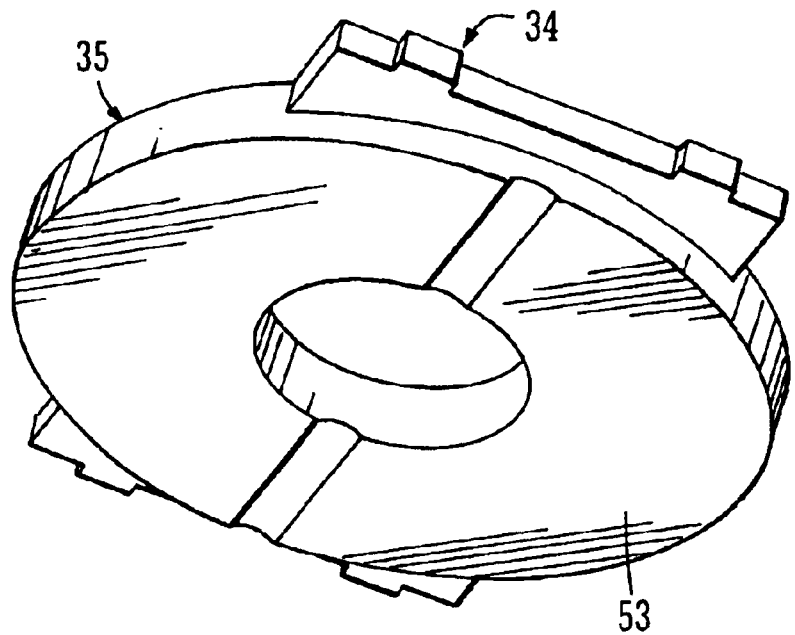
FIG. 14 is a perspective view of the pressure block used in the fork-piece assembly of FIG. 11.

Slots (33) are provided in the sides of the fork-piece (28) to interface with the protrusions (34) from the pressure block (35), shown in FIG. 14. Through the use of these slots (33) and protrusions (34), the pressure block (35) is held in operative position such that the pressure block (35) may move only in a direction parallel to the longitudinal axis of the bolt (3), as before.

Openings (31) are also provided in the sides of the fork-piece (28) to accommodate the cam-pieces (36). These openings (31) are circular and co-centric with the grooves (32) in the base of the fork-piece (28). These openings (31) are to be of larger radius than the grooves (32), allowing the cam-pieces (36) to be easily inserted from the side during assembly.

Figure 15:
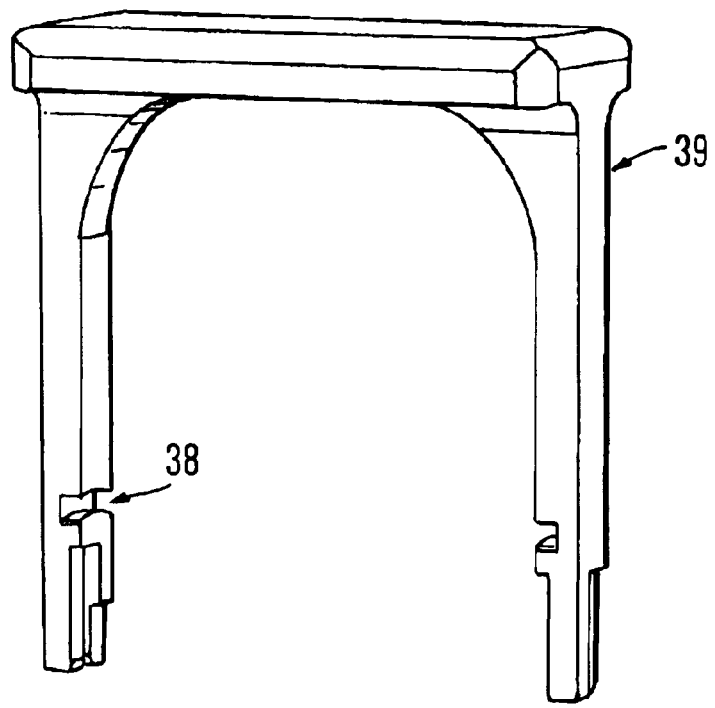
FIG. 15 is a perspective view of the attachment end of a lever suitable for use with the mechanism shown in FIGS. 10 and 11.

At the top of the fork-piece (28) sides there are tongues (37). These tongues (37) are in the shape of arcs, which are co-centric with the grooves (32) and openings (31) for the cam-pieces (36). This common axis, described above, is to be the axis of rotation for the cam-pieces (36). These tongues (37) are designed to interface with slots (38) on the inside edges of the attachment end (39) of the lever (40), see FIGS. 15 and 16, which is to attach to the cam-pieces (36). The tongues (37) are so designed that the lever (40) cannot be fully inserted into the cam-pieces (36) unless the cam-pieces (36) are in either their first position, where the cam minor axes are aligned with the bolt (3) axis, or their second position, where the cam major axes are aligned with the bolt (3) axis. A secondary condition is to be considered when locating these tongues (37), and indeed the mating slots (38). That is, that it is desirable that the tips of the attachment end

(39) of the lever (40) to be partially inserted into the cam-pieces (36) when the cam-pieces (36) are not in either their first or second positions. This will allow, if the cam-pieces (36) are accidentally moved during assembly, for the lever (40) to be used to realign the cam-pieces (36) with their correct starting positions. The amount of interference desirable between the cam-pieces (36) and lever (40) in this situation is determined by the amount of torque required to correct the position of the cam-pieces (36) when no load is applied and the amount of torque required to rotate the cam-pieces (36) when the nut (11) is in place. It is important that the slight amount of interference allows enough torque to correct the cam-pieces (36) positions when there is no loading, but insufficient to allow rotation of the cam-pieces (36) when the nut (11) is in place.

Figure 16:
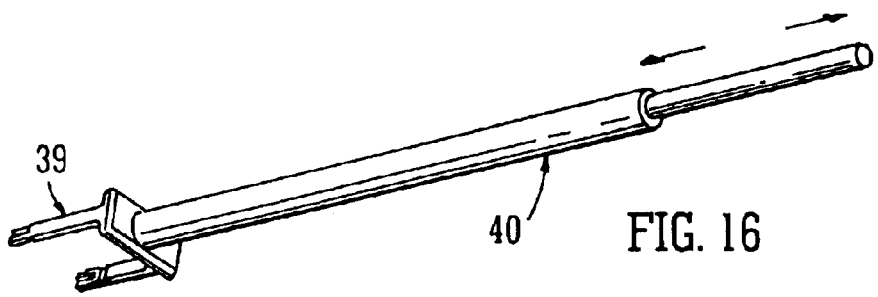
FIG. 16 is a perspective view of a full lever suitable for use with the mechanism shown in FIGS. 10 and 11.

The lever (40) can be designed so that its length can be increased, see FIG. 16. This is beneficial, because in some instances cams with differing angles of rotation, or cam rises, may need to be tightened by the same person, for example front and rear wheels. A different angle of rotation, or a different rise on the cam, will mean that a different torque will need to be applied to the lever (40) to operate it (this torque does not need to be measurable or known). An extendable lever (40) will allow a user to increase the torque applied to the lever without needing to exert extra effort. A plain lever, which is not extendable, could also be used, but would not be as good.

Figure 20:
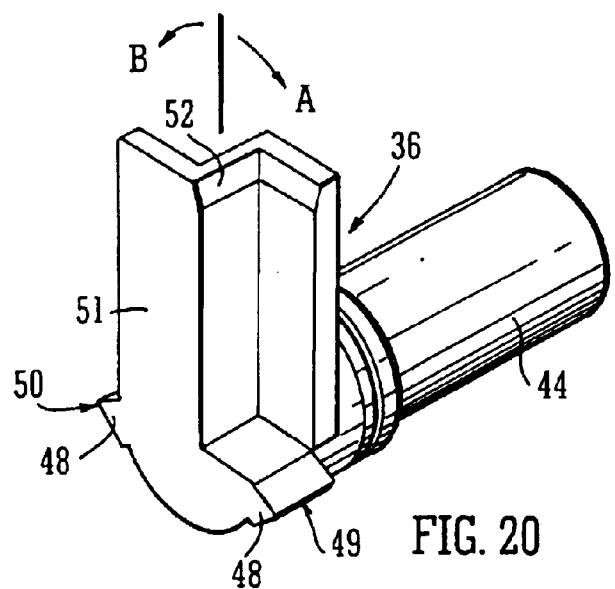
FIG. 20 is a perspective view of a cam-piece suitable for use with the mechanism shown in FIG. 11.

In the second embodiment of this invention there is a cam-piece (36), shown in FIG. 20, comprising a cam-surface (44), which is generally the same as the outer surface (6) of the cam (5) described in the first embodiment of the invention. This cam-surface (44) rests against the groove (32) surface, as before.

Figure 21:
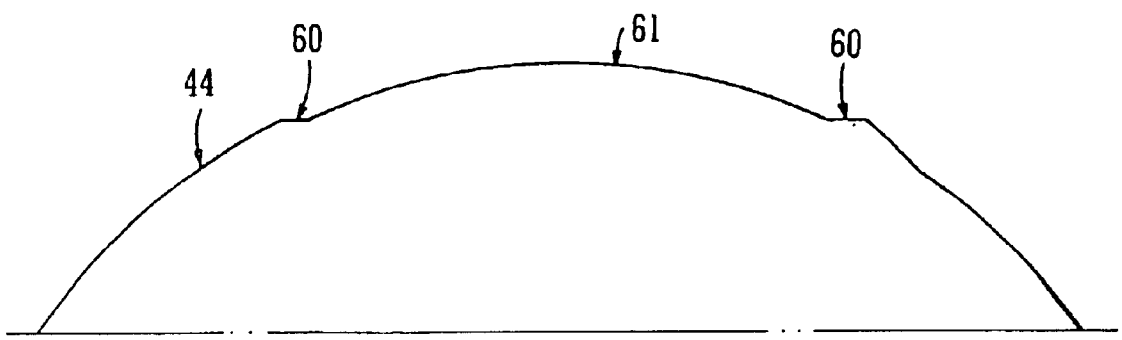
FIG. 21 is a close-up, end elevation of the cam-surface, showing bumps on the cam.

There are to be bumps (60) either side of the constant radius set-position (61) of the cam-surface (44), where the follower sits when the cam is in use, as shown in FIG. 21. These bumps (60) are so designed that they do not push the tension beyond the Yield Strength of the material. They may push tension into the Fatigue zone, but the cams are not in these positions when the mechanism is in use, only during tightening and untightening. The bumps (60) prevent vibration and/or cyclic load variations from allowing the cam to shift from its set position.

Figure 19:
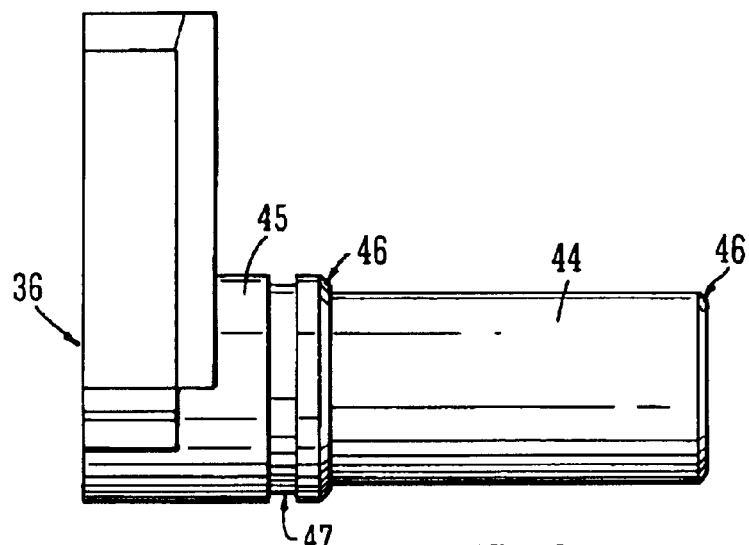
FIG. 19 is a side elevation view of a cam-piece suitable for use with the mechanism of FIG. 11.

The cam-piece (36) also features a cylindrical section (45), shown in FIG. 19, which mates with the opening (31) in the fork-piece (28) and defines the axis of rotation of the cam-piece (36), as did the shaft (9) in the first embodiment. Both the cam-surface (44) and the cylindrical section (45) have chamfers (46) at their leading edges to ease their insertion into the side of the fork-piece (28) during assembly. These chamfers (46) may be omitted without affecting the operation of the cam-pieces (36) in use.

The cylindrical section (45) also features a groove (47). A circlip maybe clipped into this groove (47) such that it presses against the side wall of the fork-piece (28) and the side of the groove (47). The circlip wraps around the groove (47) in the cam-piece (36) and is larger than the diameter of the opening (31) in the fork-piece (28). This ensures the cam-piece (36) cannot slide back out through the opening (31) once assembled. A wave-washer may be positioned between the circlip and the side wall of the fork-piece (28). The wave-washer would push these two components away from each other and introduce an amount of friction into the assembly in order to provide some resistance against rotation of the cam-piece (36) in the opening (31). This is desirable as, if there was no such resistance, the cam-pieces (36) would be more likely to rotate out of their correct first position accidentally, before the lever (40) is attached. This method of mounting the cam-piece (36) to the fork-piece (28), using the circlip and wave-washer is just one possibility. It may be beneficial to leave out one or both of these components in a given situation. This method is an example and other methods of securing the cam-piece (36) would be obvious to those skilled in the art.

Two fins (48) protrude from the sides of the cam-piece (36), as seen in FIG. 20. These fins (48) limit the rotation of the cam-piece (36) to a movement from the first to second positions (described above). Rotation in direction A is stopped by the contact of surface (49) with the abutting surface of the mounting ring (26). Rotation in direction B is similarly stopped by the contact of surface (50) with the abutting surface of the mounting ring (26). It may be beneficial to make these contact surfaces (49/50) thin to allow them to push through any dirt build-up, which may have taken place on the mounting ring (26).

At one end of the cam-piece (36) a protrusion (51) extends, which is designed to operatively mate with the attachment end (39) of the lever (40). The shape of this protrusion (51) is such as to operatively connect the lever (40) to the cam-piece (36) in order to transmit the torque required to rotate the cam-piece (36) from its first position to its second position, or vice-versa.

The protrusion (51) features chamfers (52) at its top to ease the operative assembly of the lever (40) with the cam-piece (36). These chamfers (52) may be omitted without affecting the operation of the cam-pieces (36) in use.

In this, second, embodiment the pressure block (35), see FIG. 14, is generally the same as the pressure block (17) shown in FIGS. 6 & 7 and described earlier. The plan-form shape of surface (53) on the under-side of the pressure block (35) is unimportant, but here it is shown as being circular, so as to mate completely with the underside of the nut (11). Other shapes could be used without altering the effectiveness of the pressure block (35). The other difference between this pressure block (35) and the pressure block (17) described earlier is the provision of protrusions (34) from the sides of the pressure block (35). These protrusions (34) interface with the slots (33) in the fork-piece (28) described earlier. Again, the shape or position of these protrusions (34) from the pressure block (35) and interfacing slots (33) in the fork-piece (28) can vary without altering their function. These protrusions (34) are raised from surface (53) on the underside of the pressure block (35) in order to provide room for the circlips and wave washers. This step may not be necessary if an alternative method of securing the cam-pieces (36) were utilised.

Figure 12:
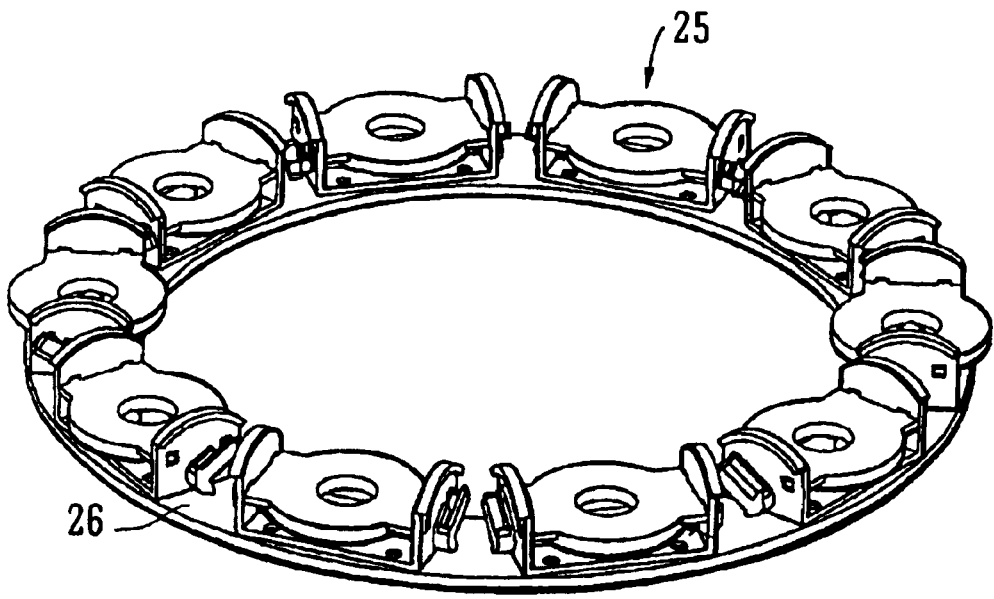
FIG. 12 is a perspective view of a number of the fork-piece assemblies of FIG. 11 mounted on a mounting ring.
Figure 13:
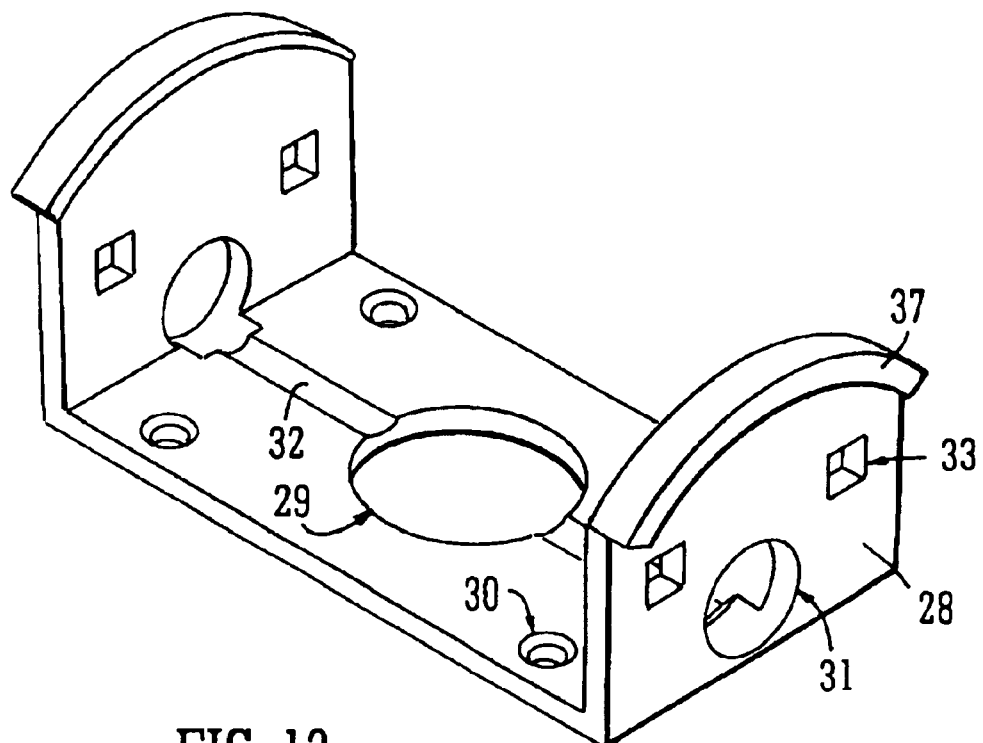
FIG. 13 is a perspective view of the fork-piece of FIG. 11.

In this embodiment a circular mounting ring (26) is provided onto which the fork-pieces (28) are affixed, as in FIG. 12. The fork-pieces (28) may be riveted, screwed or adhered to the mounting ring (26). These methods are suggestions only and other methods will be obvious to those skilled in the art and will not materially change the function of the mounting ring (26) or the fork-pieces (28). Indeed, as suggested in the first embodiment, the fork-pieces (28) may be formed as an integral part of the wheel (27) negating the need for the mounting ring (26).

Figure 25:
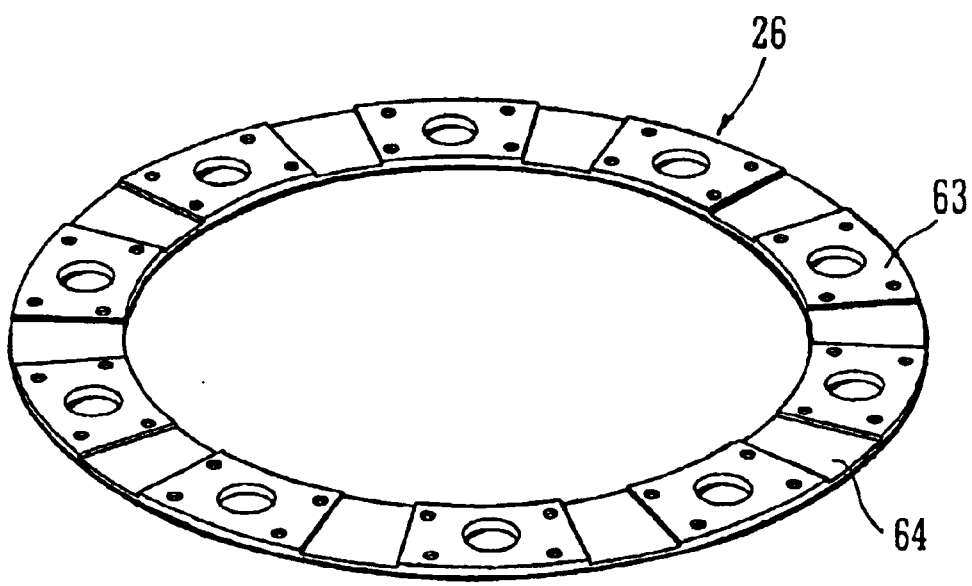
FIG. 25 is a perspective view showing the raising of a mounting ring in accordance with a further modification to the invention.

However, if a mounting ring (26) is to be used a number of variations could be made to make it more suitable for specific applications. For example, the underside (63) of the mounting ring (26) does not need to be flat. In order to reduce the problems of dirt ingress under the mounting ring (26) the underside (63) could feature a number of raised platforms (64), where dirt can reside without affecting the performance of the mechanism. In FIG. 25 one such embodiment is shown. Here those parts of the underside (63) of the mounting ring (26), which are not directly under the fork-piece assemblies (25), are raised. Other variations on this theme may see the entire underside (63) of the mounting ring (26) featuring grooves or ridges, similar to a tyre tread, this would allow the mounting ring (26) to cut through any dirt and make firm contact with the wheel (27). This is important, as it is not practical to calculate how much deformation the dirt would undergo under the applied load due to variations in dirt compound and quantity. Any variation in the deformation would affect the rise required on the cam-surface (44).

Figure 17:
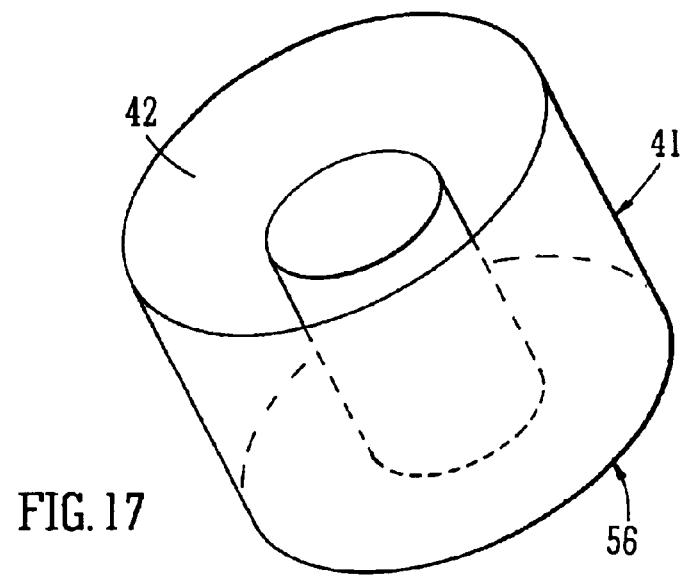
FIG. 17 is a perspective view of a capnut suitable for use with the mechanism shown in FIG. 11.

A round nut (11) as shown in FIG. 1 can still be used with this second embodiment of the invention as shown in FIG. 10. A protective cap (42), separate from or integrated with the nut (11), in the form of a capnut (41), as shown in FIG. 17, can also be used with the mechanism to protect the treads at the end of the bolt/stud/cable (3) where they are exposed to any harsh physical or chemical environment. Use of a hand-tightened, round nut (11) is envisioned but any nut could be used in particular situations. It may be advantageous to apply a small snug-torque to the nut (11) before operating the cam-piece (36) to ensure all mating components are mating snugly. For this purpose the shape of the nut (11) is not intended to be restricted. Any other nut design could be used with the mechanism without altering the use of the mechanism, of setting the bolt tension accurately, quickly and easily.

If the length of the tension member (3) and the mating components is known then further embodiments of the invention become possible. These embodiments will be obvious to those skilled in the art, but some of these are indicated below for illustrative purposes.

In an alternative embodiment of the invention the cap (42) would be used, instead of the cam-piece (36) or pressure block (35) to position the capnut (41). This may be achieved by bringing the inside surface (54) of the cap (42) into contact with the end surface (55) of the bolt (3), preventing it from tightening further. In this embodiment the mechanism would not be snug when the capnut (41) is first tightened. The cam-pieces (36) when operated would then push the pressure block (35) up into contact with the base surface (56) of the capnut (41) and impart the accurate elongation on the bolt (3) as before.

Figure 18:
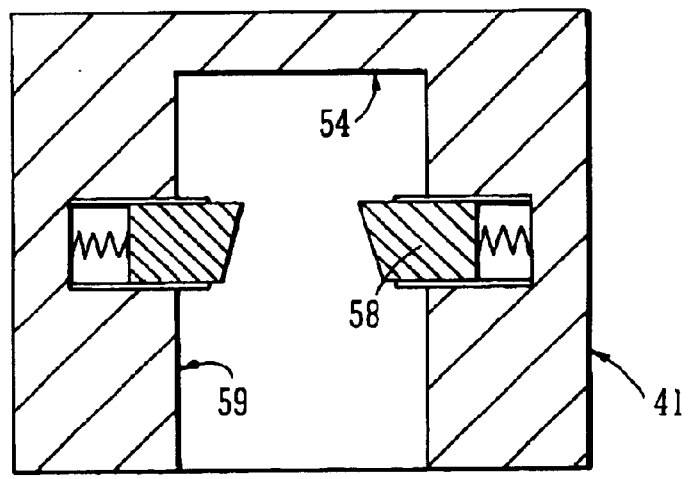
FIG. 18 is a section view of a capnut suitable for use with the sixth embodiment of the invention.
Figure 23:
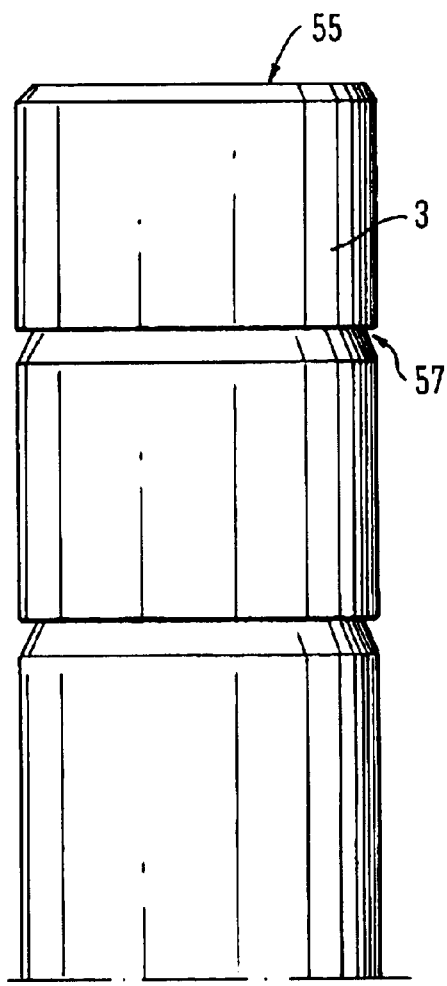
FIG. 23 is a side elevation of an unthreaded tension member suitable for use with the capnut shown in FIG. 18.

A further modification to the invention results from removing the threads from the tension member (3). The tension member (3) could feature one or more grooves (57) at various points along its length, see FIG. 23. The threads would also be removed from the capnut (41). Protrusions (58) on the inside surface (59) of the capnut (41), shown in FIG. 18, which would be spring loaded, would operatively engage these grooves (57) on the tension member (3). The capnut (41) would simply be slid longitudinally onto the tension member (3). The protrusions (58) would be wedge shaped, so that they would retract when being slid onto the tension member (3), but would protrude when being pushed off the tension member (3), as when the cam-pieces (36) are operated. Any number of mechanisms, obvious to those skilled in the art could be used to retract the protrusions (58) when it is desired to remove the capnut (41) from the tension member (3). These mechanisms include buttons, keys etc.

Figure 22:
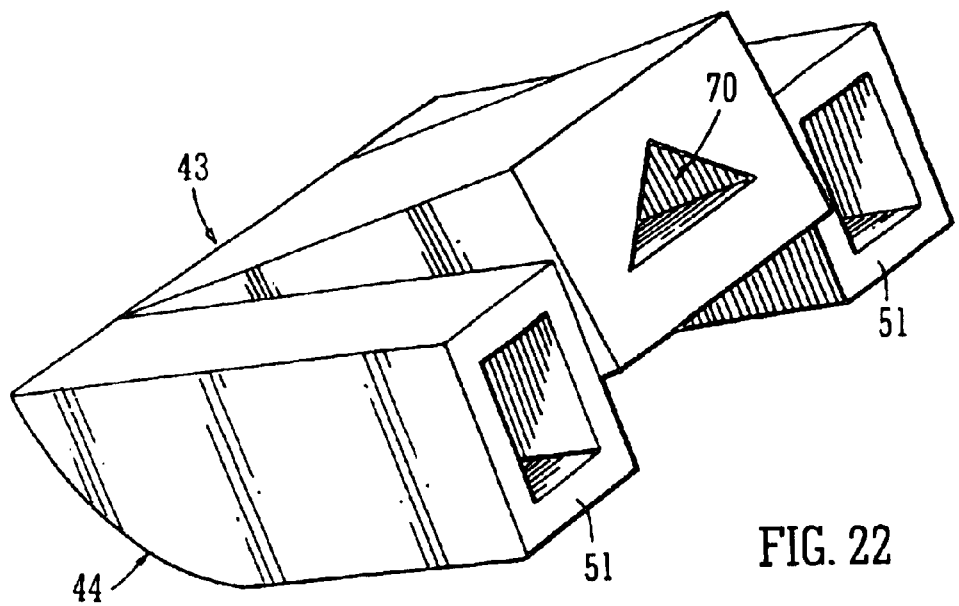
FIG. 22 is a perspective view showing how cams might be integrated into the nut design.

By integrating the cam-pieces (36) into the capnut (41), making a new nut (43), as shown in FIG. 22. This would mean the cam-surfaces (44) would push off the base (1). There would then be no requirement for the fork-piece (28) or the pressure block (35).

This embodiment might benefit from being fitted to a non-circular tension member (3), which could be fitted by means of aperture (70). The shape of the tension member (3) would orient the nut (43) to ensure the rotation of the lever (40) would take place in the correct plane. If the nut (43) were oriented incorrectly then it might not be possible to operate the lever (40) fully. This would depend on each individual application.

It is also possible to modify the device so as to not have a cap (42) on the nut (41) of the fourth embodiment, described above. The tension member (3) would feature only one groove (57), and the nut (41) would feature only one protrusion (58). The nut (41) would be pushed on further than required, i.e. the protrusion (58) would be beyond the groove (57). When the cam-pieces (36) are activated the nut (41) would slide back along the length of the tension member (3) until the protrusion (58) slots into the groove (57). The wedge shape ensures the nut (41) is held in this correct position and the tension member (3) is then imparted with the correct elongation.

In a further embodiment of the invention, the lever (40) could remain attached to the mechanism. This would only be suitable for applications where the required tension is low, as a large tension would require a large torque. If a large torque were required then a long lever (40) would be needed to impart this torque and it would not be practical to leave a large lever (40) attached in most applications. Of course, in some cases it may be possible and even desirable.

Figure 24:
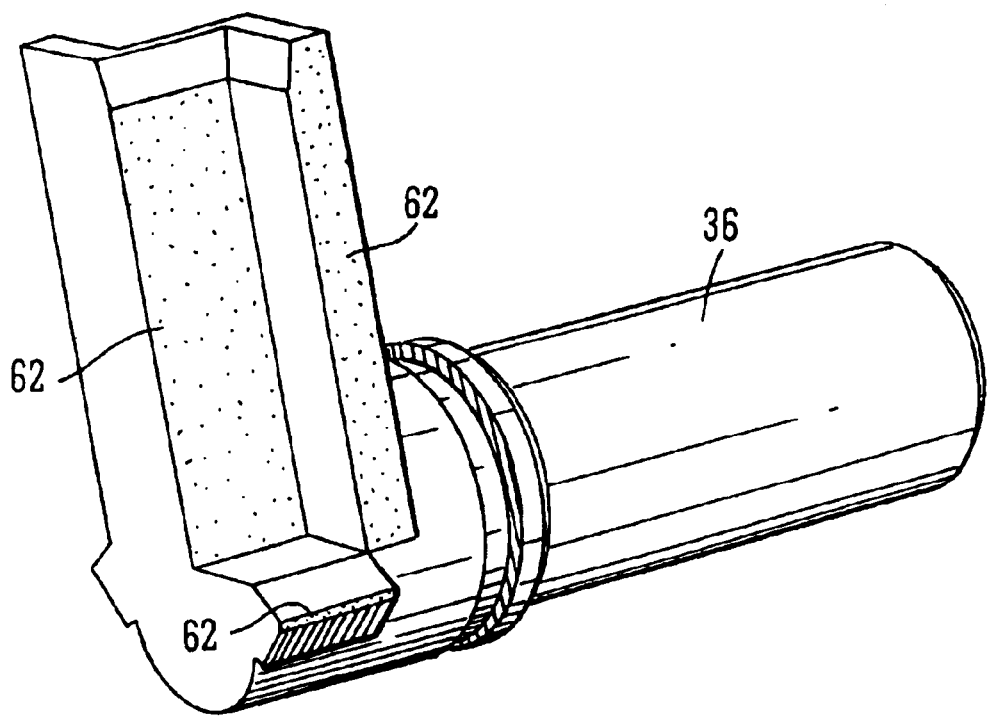
FIG. 24 is a perspective view of a cam-piece showing some possible locations for markings to ease visual inspection of the mechanism.

Reflectors/colours/markings (62) could be integrated onto the cam-pieces, see FIG. 24, to allow a quick visual inspection of the mechanism to establish whether the cam-pieces are in the first or final position and, hence, to determine if any of the cam-pieces need to be rotated.

Combinations of features of different embodiments outlined above can be made creating a myriad of other embodiments of the invention. Yet further embodiments will be obvious from the above disclosures to those skilled in the art.

The invention can be used for applications other than tensioning bolts on wheels. The above embodiments are for illustrative purposes only and are not intended to limit the invention in any way. The mechanism could be used in any situation where the accurate tensioning of a tension member is beneficial, whether this tension member is a bolt, a stud, a cable, or any other member.

There has been described herein an arrangement for bolt tension control that is relatively free from the shortcomings of the prior art. It will be apparent to those skilled in the art that modifications may be made without departing from the spirit and scope of the invention. Accordingly, it is not intended that the invention be limited except as may be necessary in view of the appended claims.

What is claimed is:

1. A tension control apparatus comprising a plurality of tension control arrangements, each tension control arrangement including a base (1) having an opening (2) therethrough to accommodate a bolt (3) and a nut (11) in engagement with the bolt (3) characterized by:

a plurality of cams (5) disposed about the opening (2), each of the cams (5) having a contoured outer surface (6), and wherein each of the cams is rotatably supported such that the contoured outer surface (6) operatively engages both the base (1) and a contact member (7, 17) interposed between the cam (5) and the nut (11); and a lever assembly (20) operatively coupled to the cams (5), such that movement of the cams (5) is substantially restricted to rotational motion from a first position in which the nut (11) is engaged with the bolt (3) and tightened by hand until it is seated against the contact member (7, 17), to a second position in which the bolt is elongated to achieve a predetermined bolt tension.

2. The tension control apparatus as claimed in claim 1 wherein each tension control arrangement is integrally formed into a self contained tensioning unit (25).

3. The tension control apparatus as claimed in claim 2, further comprising a wheel generally adapted for use on a vehicle, wherein the plurality of self contained tensioning units (25) are mounted on a mounting ring (26) or formed as integral components of the wheel (27).

4. The tension control apparatus as claimed in claim 3 wherein the plurality of self contained tensioning units (25) are positioned on the upper surface of the mounting ring (26), the underside (63) of the mounting ring (26) adapted to be mounted on the wheel.

5. The tension control apparatus as claimed in claim 4 wherein the underside (63) of the mounting ring (26) comprises a plurality of raised platforms (64), the raised platforms adapted to maintain a portion of the mounting ring (26) spaced apart from the wheel (27).

6. The tension control apparatus of claim 1, wherein one or more grooves (4) is provided in the base (1) of one or more of the tension control arrangements, each of the grooves (4) having an arcuate inner surface upon which the contoured outer surface of each cam rests.

7. The tension control apparatus of claim 6 wherein the contact member interposed between the cam and the nut is a pressure block (7) having a groove (8) facing the contoured outer surface (6) of the cam (5), the groove (8) having an arcuate inner surface upon which the contoured outer surface of the cam rests.

8. The tension control apparatus of claim 7, wherein the contact member (17) interposed between the cam (5) and the nut (11) has an opening (18) formed therethrough to accommodate the bolt (3), and the contact member (17) is integrally formed so as to provide contact members for a pair of cams (5).

9. The tension control apparatus of claim 1, wherein the lever assembly is a removable lever assembly.

10. The tension control apparatus of claim 1, further comprising a wheel generally adapted for use on a vehicle, wherein the plurality of tension control arrangements are disposed upon the wheel.

11. A tension control arrangement including a base (1) having an opening (2) therethrough to accommodate a bolt (3) and a nut (11) in engagement with the bolt (3) characterized by:
    a plurality of cams (5) disposed about the opening (2), each of the cams (5) having a contoured outer surface (6), and wherein each of the cams is rotatably supported such that the contoured outer surface (6) operatively engages both the base (1) and a contact member (7, 17) interposed between the cam (5) and the nut (11); and
    a lever assembly (20) operatively coupled to the cams (5), such that movement of the cams (5) is substantially restricted to rotational motion from a first position in which the nut (11) is engaged with the bolt (3) and tightened by hand until it is seated against the contact member (7, 17), to a second position in which the bolt is elongated to achieve a predetermined bolt tension, and wherein the lever assembly is a removable lever assembly.

12. The tension control arrangement of claim 11, wherein one or more grooves (4) is provided in the base (1), each of the grooves (4) having an arcuate inner surface upon which the contoured outer surface of each cam rests.

13. The tension control arrangement of claim 12 wherein the contact member interposed between the cam and the nut is a pressure block (7) having a groove (8) facing the contoured outer surface (6) of the cam (5), the groove (8) having an arcuate inner surface upon which the contoured outer surface of the cam rests.

14. The tension control arrangement of claim 13, wherein the contact member (17) interposed between the cam (5) and the nut (11) has an opening (18) formed therethrough to accommodate the bolt (3), and the contact member (17) is integrally formed so as to provide contact members for a pair of cams (5).

15. The tension control arrangement as claimed in claim 11 wherein the arrangement is integrally formed into a self contained tensioning unit (25).

16. The tension control arrangement of claim 11, further comprising a wheel generally adapted for use on a vehicle, wherein the plurality of tension control arrangements are disposed upon the wheel to provide a wheel tension control arrangement.

17. The wheel tension control arrangement as claimed in claim 16 wherein the plurality of self contained tensioning units (25) are mounted on a mounting ring (26) or formed as integral components of the wheel (27).

18. The wheel tension control arrangement as claimed in claim 17 wherein the plurality of self contained tensioning units (25) are positioned on the upper surface of the mounting ring (26), the underside (63) of the mounting ring (26) adapted to be mounted on the wheel.

19. The wheel tension control arrangement as claimed in claim 18 wherein the underside (63) of the mounting ring (26) comprises a plurality of raised platforms (64), the raised platforms adapted to maintain a portion of the mounting ring (26) spaced apart from the wheel (27).

20. A tension control arrangement including a base (1) having an opening (2) therethrough to accommodate a bolt (3) and a nut (11) in engagement with the bolt (3) characterized by:
    a plurality of cams (5) disposed about the opening (2), each of the cams (5) having a contoured outer surface (6) with a constant radius set position (61), and wherein each of the cams is rotatably supported such that the contoured outer surface (6) operatively engages both the base (1) and a contact member (7, 17) interposed between the cam (5) and the nut (11), and wherein the surface (6) of each cam (2) is provided with a plurality of protrusions (60) positioned at either side of the constant radius set position (61) of the cam surface (6), thereby preventing the cam from shifting from the set position (61); and
    a lever assembly (20) operatively coupled to the cams (5), such that movement of the cams (5) is substantially restricted to rotational motion from a first position in which the nut (11) is engaged with the bolt (3) and tightened by hand until it is seated against the contact member (7, 17), to a second position in which the bolt is elongated to achieve a predetermined bolt tension.

21. The tension control arrangement of claim 20, wherein one or more grooves (4) is provided in the base (1), each of the grooves (4) having an arcuate inner surface upon which the contoured outer surface of each cam rests.

22. The tension control arrangement of claim 21 wherein the contact member interposed between the cam and the nut is a pressure block (7) having a groove (8) facing the contoured outer surface (6) of the cam (5), the groove (8) having an arcuate inner surface upon which the contoured outer surface of the cam rests.

23. The tension control arrangement of claim 22, wherein the contact member (17) interposed between the cam (5) and the nut (11) has an opening (18) formed therethrough to accommodate the bolt (3), and the contact member (17) is integrally formed so as to provide contact members for a pair of cams (5).

24. The tension control arrangement as claimed in claim 20 wherein the arrangement is integrally formed into a self contained tensioning unit (25).

25. The tension control arrangement of claim 20, further comprising a wheel generally adapted for use on a vehicle, wherein the plurality of tension control arrangements are disposed upon the wheel to provide a wheel tension control arrangement.

26. The wheel tension control arrangement as claimed in claim 25 wherein the plurality of self contained tensioning units (25) are mounted on a mounting ring (26) or formed as integral components of the wheel (27).

27. The wheel tension control arrangement as claimed in claim 26 wherein the plurality of self contained tensioning units (25) are positioned on the upper surface of the mounting ring (26), the underside (63) of the mounting ring (26) adapted to be mounted on the wheel.

28. The wheel tension control arrangement as claimed in claim 27 wherein the underside (63) of the mounting ring (26) comprises a plurality of raised platforms (64), the raised platforms adapted to maintain a portion of the mounting ring (26) spaced apart from the wheel (27).

29. The tension control arrangement of claim 20, wherein the lever assembly is a removable lever assembly.

30. A wheel generally adapted for installation on a vehicle, and having a tension control arrangement including a base (1) having an opening (2) therethrough to accommodate a bolt (3) and a nut (11) in engagement with the bolt (3) characterized by:

a plurality of cams (5) disposed about the opening (2), each of the cams (5) having a contoured outer surface (6), and wherein each of the cams is rotatably supported such that the contoured outer surface (6) operatively engages both the base (1) and a contact member (7, 17) interposed between the cam (5) and the nut (11); and a lever assembly (20) operatively coupled to the cams (5), such that movement of the cams (5) is substantially restricted to rotational motion from a first position in which the nut (11) is engaged with the bolt (3) and tightened by hand until it is seated against the contact member (7, 17), to a second position in which the bolt is elongated to achieve a predetermined bolt tension, and wherein the lever assembly is a removable lever assembly.

31. A wheel generally adapted for installation on a vehicle, and having a tension control arrangement including a base (1) having an opening (2) therethrough to accommodate a bolt (3) and a nut (11) in engagement with the bolt (3) characterized by:

a plurality of cams (5) disposed about the opening (2), each of the cams (5) having a contoured outer surface (6) with a constant radius set position (61), and wherein each of the cams is rotatably supported such that the contoured outer surface (6) operatively engages both the base (1) and a contact member (7, 17) interposed between the cam (5) and the nut (11), and wherein the surface (6) of each cam (2) is provided with a plurality of protrusions (60) positioned at either side of the constant radius set position (61) of the cam surface (6), thereby preventing the cam from shifting from the set position (61); and a lever assembly (20) operatively coupled to the cams (5), such that movement of the cams (5) is substantially restricted to rotational motion from a first position in which the nut (11) is engaged with the bolt (3) and tightened by hand until it is seated against the contact member (7, 17), to a second position in which the bolt is elongated to achieve predetermined bolt tension.

* * * * *